United States Patent
Okada et al.

Patent Number: 6,066,416
Date of Patent: May 23, 2000

[54] NICKEL HYDROXIDE POSITIVE ELECTRODE ACTIVE MATERIAL HAVING A SURFACE LAYER CONTAINING A SOLID SOLUTION NICKEL HYDROXIDE WITH MANGANESE INCORPORATED THEREIN

[75] Inventors: Yukihiro Okada, Neyagawa; Kazuhiro Ohta, Sanda; Hiromu Matsuda, Hyogo; Yoshinori Toyoguchi, Yao, all of Japan

[73] Assignee: Matsushita Electric Industrial Co., Ltd., Osaka-Fu, Japan

[21] Appl. No.: 09/120,544

[22] Filed: Jul. 22, 1998

Related U.S. Application Data

[63] Continuation of application No. 08/849,585, filed as application No. PCT/JP96/03159, Oct. 28, 1996, abandoned.

[30] Foreign Application Priority Data

Nov. 22, 1995 [JP] Japan ................................ 7-304463
Jun. 28, 1996 [JP] Japan ................................ 8-170086

[51] Int. Cl.[7] .............................................. H01M 4/32
[52] U.S. Cl. .................................. 429/223; 429/224
[58] Field of Search ................................ 429/223, 224; 252/182.1; 423/140, 594

[56] References Cited

U.S. PATENT DOCUMENTS

| | | |
|---|---|---|
| 4,251,603 | 2/1981 | Matsumoto et al. |
| 4,898,794 | 2/1990 | Doi et al. |
| 4,983,474 | 1/1991 | Doi et al. |

(List continued on next page.)

FOREIGN PATENT DOCUMENTS

| | | |
|---|---|---|
| 0 523 284 | 1/1993 | European Pat. Off. |
| 0 544 011 | 6/1993 | European Pat. Off. |
| 0 633 223 | 1/1995 | European Pat. Off. |

(List continued on next page.)

OTHER PUBLICATIONS

Guerlou–Demourgues, L., et al., "New Manganese–substituted Nickel Hydroxides. Part 1. Crystal Chemistry and Physical Characterization", J. Power Sources, vol. 52, No. 2, pp. 269–274, (Dec. 1994).

Chemical Abstracts No.: 138075: Ohta, K., et al., "Nickel Hydroxide Electrode: Improvement of Charge Efficiency at High Temperature", Chemical Abstracts, vol. 122, No. 12, (Mar. 1995); Proc–Electrochem. Soc.(1994).

P. Oliva, et al., "Review of the Structure and the Electrochemistry of Nickel Hydroxides and Oxy–Hydroxides", *Journal of Power sources*, vol. 8, pp. 229–255 (1982). Month unknown.

Edited by T. Keily, et al., "Power Sources 12", Proceedings: 16th International Power Sources Symposium, 1988. Month unknown.

*Primary Examiner*—Maria Nuzzolillo
*Assistant Examiner*—Jennifer O'Malley
*Attorney, Agent, or Firm*—Panitch Schwarze Jacobs & Nadel, P.C.

[57] ABSTRACT

A positive electrode active material and a positive electrode for an alkaline storage battery are disclosed which exhibit high charge efficiency at a high temperature. The positive electrode active material comprises particles formed by agglomeration of crystals of nickel hydroxide active material, at least the surface layer of the particles containing a solid solution nickel hydroxide with manganese incorporated therein. The solid solution is present as crystals growing on the crystal surface of said nickel hydroxide active material and/or crystals independent of crystals of the nickel hydroxide active material. The content of manganese in the solid solution is at least one mole percent on the whole metal ions in the solid solution and not higher than 10 mole percent on the combined total amount of the metal ions in the nickel hydroxide active material and the solid solution. The positive electrode for an alkaline storage battery contains the above-mentioned active material and a compound of at least one element selected from the group consisting of Ca, Sr, Ba, Cu, Ag, Cd, Y and Yb.

16 Claims, 1 Drawing Sheet

U.S. PATENT DOCUMENTS

| | | |
|---|---|---|
| 5,079,110 | 1/1992 | Nakahori et al. . |
| 5,281,494 | 1/1994 | Ettel et al. ............................... 429/223 |
| 5,344,728 | 9/1994 | Ovshinsky et al. ...................... 429/223 |
| 5,348,822 | 9/1994 | Ovshinsky et al. ...................... 429/223 |
| 5,466,543 | 11/1995 | Ikoma et al. ............................... 429/59 |
| 5,501,917 | 3/1996 | Hong . |
| 5,506,076 | 4/1996 | Miyamoto et al. ...................... 429/223 |
| 5,508,121 | 4/1996 | Sawa ........................................ 429/59 |
| 5,523,182 | 6/1996 | Ovshinsky et al. ...................... 429/223 |
| 5,549,992 | 8/1996 | Iwane et al. ............................. 429/223 |
| 5,567,549 | 10/1996 | Ovshinsky et al. ...................... 429/223 |
| 5,569,562 | 10/1996 | Glemser et al. ........................ 429/223 |
| 5,569,563 | 10/1996 | Ovshinsky et al. ...................... 429/223 |
| 5,599,436 | 2/1997 | Axmann ................................... 205/509 |
| 5,635,313 | 6/1997 | Abe ......................................... 429/223 |
| 5,660,952 | 8/1997 | Yano et al. ............................. 429/223 |
| 5,670,271 | 9/1997 | Axmann ................................... 429/59 |
| 5,700,596 | 12/1997 | Ikoma et al. . |

FOREIGN PATENT DOCUMENTS

| | | |
|---|---|---|
| 0 650 207 | 4/1995 | European Pat. Off. . |
| 0696076 A1 | 2/1996 | European Pat. Off. . |
| 0738017 A1 | 10/1996 | European Pat. Off. . |
| 43 23 007 A1 | 1/1995 | Germany . |
| 51-122737 | 10/1976 | Japan . |
| 59-068168 | 4/1984 | Japan . |
| 61-104565 | 5/1986 | Japan . |
| 61-037733 B2 | 8/1986 | Japan . |
| 62-237667 | 10/1987 | Japan . |
| 62-054235 B2 | 11/1987 | Japan . |
| 63-152886 | 6/1988 | Japan . |
| 3-026903 B2 | 4/1991 | Japan . |
| 3-093161 | 4/1991 | Japan . |
| 3-050384 B2 | 8/1991 | Japan . |
| 4-094058 | 3/1992 | Japan . |
| 4-080513 B2 | 12/1992 | Japan . |
| 5-028992 | 2/1993 | Japan . |
| 7-014578 | 1/1995 | Japan . |
| 7-073876 | 3/1995 | Japan . |
| 7-335214 | 12/1995 | Japan . |
| 8-222215 | 8/1996 | Japan . |
| 09115543 | 2/1997 | Japan . |
| 9-050805 | 2/1997 | Japan . |
| 9-082319 | 3/1997 | Japan . |
| WO 9411910 | 5/1994 | WIPO . |
| WO 94/19939 | 9/1994 | WIPO . |

NICKEL HYDROXIDE POSITIVE ELECTRODE ACTIVE MATERIAL HAVING A SURFACE LAYER CONTAINING A SOLID SOLUTION NICKEL HYDROXIDE WITH MANGANESE INCORPORATED THEREIN

CROSS REFERENCE TO RELATED APPLICATION

This application is a continuation of application Ser. No. 08/849,585, filed Jul. 16, 1997, now abandoned entitled "Positive Electrode Active Material and Positive Electrode for Alkaline Storage Batteries", which is a 371 of PCT/JP96/03159 filed Oct. 28, 1996 the entire disclosure of which is incorporated herein by reference.

TECHNICAL FIELD

The present invention relates to a positive electrode active material for alkaline storage batteries and a positive electrode for alkaline storage batteries using the same.

BACKGROUND ART

With a recent trend toward the value addition, size and weight reduction of portable appliances, there is a growing demand for high-energy secondary batteries. In such applications as electric vehicles, too, alkaline storage batteries are used as a mobile power source, and the development of high-energy secondary batteries has been hoped for. In answer to that market demand, research has been conducted on improvement of nickel-cadmium storage batteries and nickel-metal hydride storage batteries.

High-capacity electrodes have been developed and used as nickel positive electrodes for alkaline storage batteries for such purposes. They include sintered type electrodes prepared by filling a sintered nickel plaque with nickel hydroxide in a chemical process or electrochemical process and non-sintered type electrodes prepared by filling nickel hydroxide into high-porous foamed nickel or porous nickel fabrics.

The problem with those nickel electrodes is that the charge efficiency drops under a high-temperature atmosphere.

Attempts to overcome the problem have led to a new idea that cobalt is incorporated into nickel hydroxide to form a solid solution so as to shift the oxidation potential toward the "anodic" direction thereby improving the charge efficiency of nickel electrodes at high temperatures (Japanese Laid-Open Patent Publications Sho 59-68168 and Sho 63-152866).

Indeed, the charge efficiency of nickel electrodes at high temperatures can be raised that way. In this method, however, cobalt is incorporated uniformly in the nickel hydroxide for electrodes to form a solid solution, and has to be added in a large quantity in order to achieve a desired results. The problem with this is that a large amount of cobalt induces a reduction of nickel which is directly responsible for discharge capacity in the active material. In addition, the use of cobalt pushes up the production cost.

The object of the present invention is to provide a positive electrode active material for an alkaline storage battery with high charge efficiency at a high temperature without a substantial reduction in the percentage of nickel which determines the discharge capacity.

Another object of the present invention is to provide a positive electrode for an alkaline storage battery including the above-mentioned active material.

DISCLOSURE OF INVENTION

The present invention provides a positive electrode active material for an alkaline storage battery, comprising particles formed by agglomeration of crystals of nickel hydroxide active material, at least the surface layer of the particles containing a solid solution nickel hydroxide with manganese incorporated therein.

In one aspect of the present invention, the solid solution is present as crystals growing on the crystal surface of the nickel hydroxide active material and/or crystals independent of the crystals of the nickel hydroxide active material. The content of manganese in the solid solution is at least one mole percent of the total content of metal ions in the solid solution.

The content of manganese in the solid solution is preferably not lower than 3 mole percent, more preferably not lower than 10 mole percent of the overall metal ion content in the solid solution.

The ratio of manganese in the solid solution is preferably not higher than 10 mole percent of the combined amount of the metal ions in the nickel hydroxide active material and solid solution.

The positive electrode active material of the present invention can be prepared by a step of producing particles of nickel hydroxide active material and a subsequent step in which an aqueous solution containing bivalent nickel ions and manganese ions is reacted with caustic alkali in the presence of the particles of the nickel hydroxide active material to form a solid solution nickel hydroxide with manganese incorporated therein on the surface of the nickel hydroxide active material.

The present invention provides a positive electrode for an alkaline storage battery comprising, in addition to the above-mentioned materials, a compound of at least one element selected from the group consisting of Ca, Sr, Ba, Cu, Ag, Cd, Y and Yb.

The content of the compound is preferably 0.1 to 5 parts by weight per 100 parts by weight of the active material.

BEST MODE FOR CARRYING OUT THE INVENTION

The present invention is anodiced on a discovery that incorporation of manganese into nickel hydroxide to produce a solid solution can shift the oxidation potential of nickel hydroxide toward the "anodic" direction.

Further, the inventors discovered that the charge efficiency at a high temperature can be improved with incorporation of a small amount of manganese not by turning all the nickel hydroxide into a solid solution with manganese but by having a solid solution of nickel hydroxide with manganese contained at least in the surface layer of particles which are accumulated crystals of nickel hydroxide active material.

The positive electrode active material of the present invention can be manufactured by a step of producing particles of nickel hydroxide active material and a subsequent step in which an aqueous solution containing bivalent nickel ions and manganese ions is reacted with caustic alkali in the presence of the above-mentioned particles of the nickel hydroxide active material to form a solid solution nickel hydroxide with manganese incorporated therein on the surface of the nickel hydroxide active material.

The nickel hydroxide active material is obtained preferably by reacting an aqueous solution containing bivalent nickel ions with caustic alkali.

Figure 1:
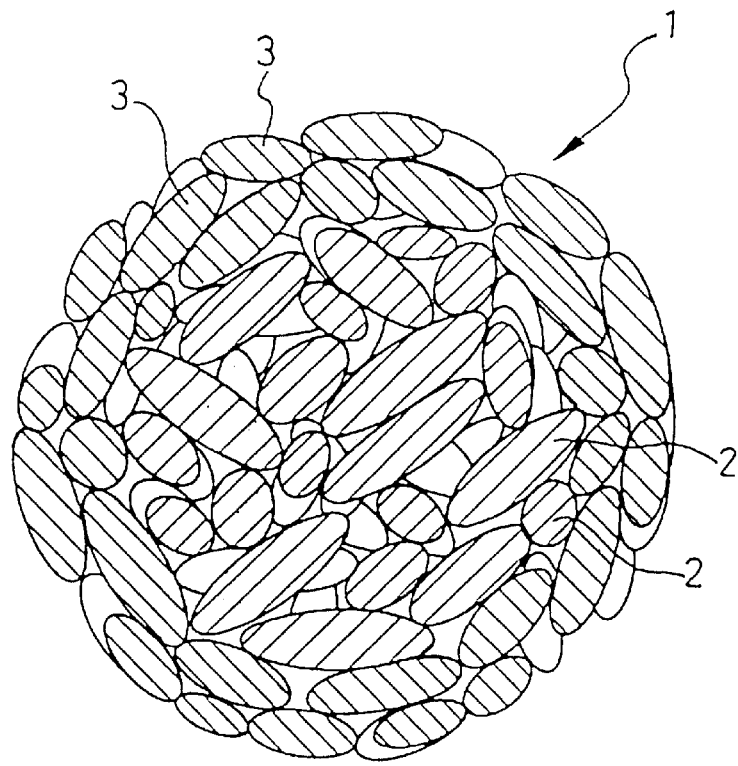
FIG. 1 is a schematic diagram showing a particle model of the positive electrode active material of the present invention.
Figure 2:
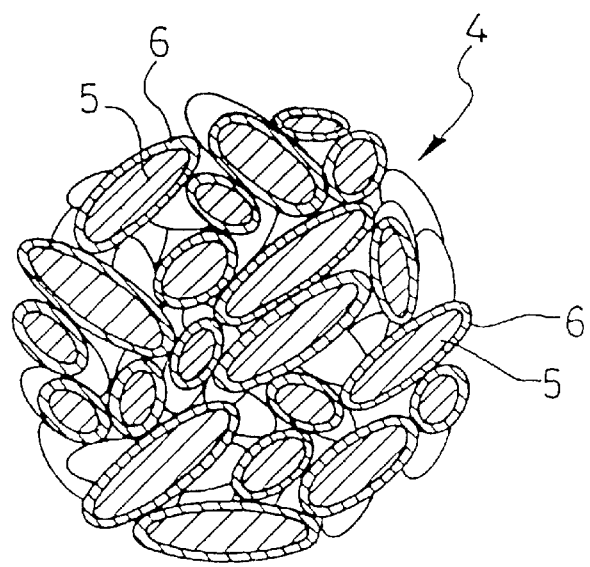
FIG. 2 is a schematic diagram showing another particle model of the positive electrode active material of the present invention.

FIG. 1 and FIG. 2 show particle models of the positive electrode active material for alkaline storage batteries, the material made up of particles formed by agglomeration of nickel hydroxide active material and at least the surface layer of the particles containing a solid solution nickel hydroxide with manganese incorporated therein.

It is to be understood that the models in FIG. 1 and FIG. 2 are provided merely for the purpose of illustrating the present invention and that the shape and relative size of individual particles and crystals forming particles and the number of crystals forming particles are not always identical with those found in practice.

Particle 1 of the active material shown as a model in FIG. 1 is composed of a large number of agglomerated crystals 2 of nickel hydroxide active material. And the surface layer of the particle 1 is covered mainly with crystals 3 of a solid solution nickel hydroxide with manganese incorporated therein.

Active material particle 4 illustrated in a model in FIG. 2 is formed by agglomeration of a large number of crystals 5 of nickel hydroxide active material. On the surface of each crystal there grows crystal 6 of a solid solution nickel hydroxide with manganese incorporated therein.

In the manufacturing process of the present invention, secondary or tertiary particles are first formed by agglomeration of crystals of nickel hydroxide active material. Then, an aqueous solution containing bivalent nickel ions and manganese ions is reacted with caustic alkali in the presence of the above-mentioned particles to grow crystals of a manganese-incorporated solid solution of nickel hydroxide. Thus, a solid solution nickel hydroxide with manganese incorporated therein is formed on the surface of the secondary or tertiary particles. In addition, the aqueous solution of nickel ions and manganese ions penetrates between the crystals forming secondary or tertiary particles, and reacts with caustic alkali to produce a solid solution of nickel hydroxide containing manganese inside the particles. A solid solution nickel hydroxide with manganese incorporated therein forms independent crystals and also grows on the surface of crystals which agglomerate into secondary or tertiary particles. The active material obtained by the method of the present invention is considered to be something like a combination of the models illustrated in FIG. 1 and FIG. 2. In the figures, crystals 2 and 5 are illustrated as smallest units but there can be cases where the crystals 2 and 5 are secondary particles.

Manganese incorporated into nickel hydroxide in a solid solution state which is contained in the positive electrode active material of the present invention is responsible for shifting the charge potential of active material toward the "anodic" direction. That decreases the oxidation-reduction equilibrium potential of the active material, and hence the charge voltage. The charge reaction starts on the surface layer of active material particles which forms an interface with electrolyte, that is, the surface layer comprising a solid solution of nickel hydroxide incorporated with manganese, thus improving the charge acceptance and utilization of the active material.

The ratio of manganese incorporated into the solid solution nickel hydroxide should be at least 1 mole percent of the total metal ions in the solid solution, preferably not lower than 3 mole percent, more preferably not lower than 10 mole percent if the charge potential is to be effectively shifted to the "anodic" direction.

The amount of manganese in the solid solution could be raised up to 50 mole percent or so. But as the percentage of manganese in the active material increases, that of nickel which is responsible for discharge reaction decreases, resulting in a reduced capacity. For this reason, the ratio of manganese in the solid solution is preferably not larger than 10 mole percent of the overall metal ions in the nickel hydroxide active material and the solid solution.

The most typical process of manufacturing the positive electrode active material of the present invention is the reaction crystallization method which has just been outlined and will be described later in an embodiment of the present invention. While the embodiment describes a two-step synthesis process in which two reaction vessels are used, a multi-step process with more reaction vessels is possible. Also, practical are the synthesis method described in Comparative Example 1 in which nickel salt solution is changed into an aqueous mixture solution containing manganese salt in the course of synthesis and a method in which nickel hydroxide active material as anodic phase is first produced in the form of dry powder, which is then dispersed in a liquid and is given an addition of the aqueous solution containing nickel salt and manganese salt and aqueous alkaline solution.

The intended active material or positive electrode also can be obtained in such a process in which a nickel hydroxide active material or positive electrode using the active material is impregnated with an aqueous mixture solution containing nickel salt and manganese salt, followed by treatment with an aqueous alkaline solution.

It is also possible to produce the positive electrode of the present invention by the following two-step process: the first step comprising filling a sintered nickel plaque with nickel hydroxide by chemical impregnation or electrolytic deposition method, and the second step comprising filling said plaque with a solid solution nickel hydroxide having manganese incorporated therein either by a chemical impregnation of an aqueous mixed solution containing nickel salt and manganese salt followed by treatment in an aqueous alkaline solution or by an electrolytic deposition involving electrolysis in an aqueous mixed solution containing nickel salt and manganese salt. Still another method of producing the aimed active material comprises treatment of nickel hydroxide as anodic phase in a hot aqueous alkaline solution containing manganese salt. The hot aqueous alkaline solution is an aqueous solution at 30 to 120° C. containing 5 to 50 percent by weight of at least one hydroxide out of Li, Na and K.

It is known that the oxygen evolution potential will rise if a compound of an element selected from the group consisting of Ca, Sr, Ba, Cu, Ag, Cd, Y and Yb is added to the positive electrode (Japanese Laid-Open Patent Publication Hei 5-28992, for example). This means that there will be a rise in overpotential to trigger an oxygen-generating competitive reaction during charging under a high-temperature atmosphere. The reaction is expressed by the reaction formula (2). As a result, the charge reaction of formula (1) to convert nickel hydroxide into nickel oxyhydroxide will proceed well enough, raising the positive electrode utilization even under a high temperature atmosphere. In summary, the positive electrode, which is made of an active material containing a solid solution nickel hydroxide with manganese incorporated therein and a compound of at least one element selected from the group consisting of Ca, Sr, Ba, Cu, Ag, Cd, Y and Yb, is effective for lowering the charge potential and raising the oxygen evolution potential. This synergistic effect can further improve the charge efficiency at a high temperature.

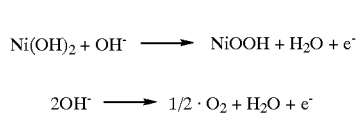

$$Ni(OH)_2 + OH^- \longrightarrow NiOOH + H_2O + e^- \quad (1)$$

$$2OH^- \longrightarrow 1/2 \cdot O_2 + H_2O + e^- \quad (2)$$

The foregoing compounds include preferably $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, BaO, $Cu_2O$, $Ag_2O$, CdO, $YF_3$, $Y(OH)_3$, $Y_2(CO_3)_3$, $Y_2O_3$, $YbF_3$, $Yb(OH)_3$, $Yb_2O_3$ and the like.

It is widely known that the nickel hydroxide active material can be kept from swelling by incorporating the whole active material with at least one element selected from the group consisting of Mg, Zn, Cd and Ca to form a solid solution and that the utilization can be improved by incorporating cobalt into the whole active material in a solid solution state. In the positive electrode of the present invention, too, it is desirable that the anodic phase nickel hydroxide has those elements incorporated therein.

The invention will be further illustrated by the following examples.

EXAMPLE 1

A 1 M aqueous solution of $NiSO_4$, a 2 M aqueous solution of sodium hydroxide and a 2 M aqueous ammonia solution were all continuously pumped into a reaction vessel at the same flow rate using a metering pump, and the three solutions were continuously stirred in the vessel. A suspension containing active material particles and other reaction products continuously overflowing the reaction vessel was poured into a second reaction vessel.

Then, to the second vessel was given a continuous flow at the same rate with stirring of the following solutions, each by a metering pump: an aqueous solution prepared by mixing a 1 M aqueous solution of $NiSO_4$ and a 1 M aqueous solution of $MnSO_4$ in a volume ratio of 4 to 1 (metal ion molar ratio of Ni:Mn=80:20), a 2 M aqueous solution of sodium hydroxide and a 2 M aqueous ammonia solution. Active material particles were then separated from a suspension containing active material particles and other reaction products continuously over flowing the second reaction vessel.

The active material particles were then placed in a hot aqueous alkaline solution containing 25 percent by weight of NaOH at 60° C., stirred for 24 hours, washed with water and dried at 90° C. Thus, a positive electrode material was obtained.

The positive electrode active material thus prepared is made up of particles formed by agglomeration of crystals of nickel hydroxide active material, the particles containing at least on the surface a solid solution nickel hydroxide with manganese incorporated therein. The content of manganese in the solid solution is 20 mole percent of the total amount of metal ions contained in the solid solution, the rest of 80 mole percent being nickel. The positive electrode active material obtained here shall be coded "d".

Active materials "a" to "c" were produced in the same manner but by varying the ratio of nickel to manganese ions in an aqueous mixture solution of $NiSO_4$ and $MnSO_4$ that were pumped into the second reaction vessel. Table 1 shows the ratios of metal ions in the solid solution.

TABLE 1

| Active material | Contents in solid solution (mole percent) | |
|---|---|---|
| | Ni | Mn |
| a | 99 | 1 |
| b | 97 | 3 |
| c | 90 | 10 |
| d | 80 | 20 |

Comparative Example 1

A 1 M aqueous solution of $NiSO_4$, a 2 M aqueous solution of sodium hydroxide and a 2 M aqueous ammonia solution were all continuously pumped into a reaction vessel at the same flow rate using a metering pump, and the three solutions were continuously stirred in the vessel. Then the active material particles were separated from a suspension containing active material particles and other reaction products continuously overflowing the reaction vessel. The active material particles were placed in a hot aqueous alkaline solution containing 25 percent by weight of NaOH at 60° C., then stirred for 24 hours, washed with water and dried at 90° C. Thus, a positive electrode material was obtained.

Comparative Example 2

The following aqueous solutions were pumped into a reaction vessel at the same flow rate, each by a metering pump, with continuous stirring of solutions: an aqueous solution prepared by mixing a 1 M aqueous solution of $NiSO_4$ and a 1 M solution of $MnSO_4$ in a volume ratio of 4 to 1 (metal ion molar ratio of Ni:Mn=80:20), a 2 M aqueous solution of sodium hydroxide and a 2 M aqueous ammonia solution. Active material particles were then separated from a suspension containing active material particles and other reaction products continuously overflowing the reaction vessel. The active material particles were then placed in a hot aqueous alkaline solution containing 25 percent by weight of NaOH at 60° C., then stirred for 24 hours, washed with water and dried at 90° C. Thus, a positive electrode material was obtained.

Each of the active material powders "a" to "d" was mixed with a cobalt hydroxide powder in a weight ratio of 85:15, and then kneaded with water into a paste. The paste was then filled into a foamed nickel electrode substrate, dried and pressed into positive electrodes "A" to "D" with a capacity of about 1 Ah. Similarly, electrodes were made using the active materials of Comparative Examples 1 and 2.

Half cells were fabricated with those positive electrodes, counter electrodes made of a hydrogen storage alloy and having a larger capacity than the positive electrodes, and an electrolyte of 31 percent by weight of an aqueous KOH solution. The cells were charged at a 10-hour rate for 15 hours, stood still for 3 hours, and then discharged down to 0.9 volt at a 5-hour rate. Measurements were performed on the discharge capacity of a group of cells after they were charged at an ambient temperature of 10° C. and discharged at 20° C. ($C_{10}$) and another group that were charged at 40° C. and discharged at 20° C. ($C_{40}$). The ratios of discharge capacity $C_{40}$ to discharge capacity $C_{10}$ were calculated. The results are given in Table 2.

TABLE 2

| Positive electrode | Discharge capacity ratio (%) ($C_{40}/C_{10}$) |
|---|---|
| A | 61 |
| B | 64 |
| C | 68 |
| D | 72 |
| Comparative Example 1 | 60 |
| Comparative Example 2 | 75 |

The results indicate that the positive electrodes made of an active material containing a solid solution of nickel hydroxide incorporated with manganese are improved in charge efficiency at a high temperature. It is also shown that higher efficiency is achieved when the percentage of manganese in the solid solution is not lower than 3 mole percent of the total metal ions therein. The efficiency is still higher when the manganese content exceeds 10 mole percent of the total metal ions in the solid solution.

In another test, determinations were made by atomic absorption spectrophotometry on the ratios of nickel to manganese in the metal ions contained in the whole positive electrode active material "d" and that of Comparative Example 2. The results are shown in Table 3.

TABLE 3

| Active material | Molar ratios (%) in 100 g of active material | |
|---|---|---|
| | Ni | Mn |
| d | 93 | 7 |
| Comparative Example 2 | 80 | 20 |

Anodiced on the results in Table 2 and Table 3, a comparison was is made between the positive electrode active material "d" comprising in part a solid solution nickel hydroxide with manganese incorporated therein and the positive electrode active material of Comparative Example 2, which is entirely made up of a solid solution nickel hydroxide with manganese incorporated therein. It shows that the positive electrode active material "d" achieves with a much less content of manganese the same efficiency as that of Comparative Example 2.

EXAMPLE 2

The positive electrode active material "d", cobalt hydroxide and $CaF_2$ were mixed in a proportion of 84:15:1, and the mixture was kneaded with water into a paste. From this paste, a positive electrode "E" was made in the same manner as in the foregoing. With this positive electrode, a half cell was fabricated in the same way as in the foregoing, and the ratios of $C_{40}/C_{10}$ were calculated. The results are shown in Table 4 in comparison with those of the positive electrode "D".

TABLE 4

| Positive electrode | Discharge capacity ratio (%) ($C_{40}/C_{10}$) |
|---|---|
| D | 72 |
| E | 82 |

It is evident from the results that the charge efficiency at a high temperature is further improved with the nickel positive electrode made of an active material which contains a solid solution nickel hydroxide with manganese incorporated therein that is furthermore mixed with a Ca compound. It is also confirmed that the addition of the Ca compound is most preferably 0.1 to 5 parts by weight per 100 parts by weight of the active material containing a solid solution nickel hydroxide with manganese incorporated therein.

In Example 2, $CaF_2$ was used as a compound to raise the oxygen evolution potential. The identical results can be obtained using the following compounds in place of $CaF_2$: $Ca(OH)_2$, CaO, CaS, $CaSO_4$, $CaSi_2O_5$, $CaC_2O_4$, $CaWO_4$, $SrCO_3$, $Sr(OH)_2$, BaO, $Cu_2O$, $Ag_2O$, CdO, $YF_3$, $Y(OH)_3$, $Y_2(CO_3)_3$, $Y_2O_3$, $YbF_3$, $Yb(OH)_3$ or $Y_2O_3$.

Industrial Applicability

The present invention provides a high-performance positive electrode active material which can achieve high charge efficiency at a high temperature with a small amount of manganese. The positive electrode comprising this active material produces an alkaline storage battery with high charge efficiency at a high temperature.

We claim:

1. A positive electrode active material for an alkaline storage battery comprising particles formed by agglomeration of crystals of a nickel hydroxide active material, the surface layer of said particles containing a solid solution nickel hydroxide with manganese incorporated therein and the solid solution containing a higher manganese content than that of the solid solution and the nickel hydroxide active material combined.

2. The positive electrode active material for an alkaline storage battery in accordance with claim 1, wherein said solid solution is present as crystals growing on the crystal surface of said nickel hydroxide active material and/or crystals independent of the crystals of said nickel hydroxide active material.

3. The positive electrode active material for an alkaline storage battery in accordance with claim 1, wherein the content of manganese in said solid solution is at least one mole percent of the whole content of metal ions in said solid solution.

4. The positive electrode active material for an alkaline storage battery in accordance with claim 3, wherein the content of manganese in said solid solution is not lower than three mole percent of the whole content of metal ions in said solid solution.

5. The positive electrode active material for an alkaline storage battery in accordance with claim 3, wherein the content of manganese in said solid solution is not lower than 10 mole percent of the whole content of metal ions in said solid solution.

6. The positive electrode active material for an alkaline storage battery in accordance with claim 3, wherein the content of manganese in said solid solution is not higher than 10 mole percent of the combined amount of the metal ions in said nickel hydroxide active material and said solid solution.

7. A process of making a positive electrode active material for an alkaline storage battery comprising a step of producing particles of nickel hydroxide active material and a subsequent step in which an aqueous solution containing bivalent nickel ions and bivalent manganese ions is reacted with caustic alkali in the presence of said particles of nickel hydroxide active material to form a solid solution nickel hydroxide with manganese incorporated therein on the surface of said nickel hydroxide active material.

8. A positive electrode for an alkaline storage battery containing an active material comprising particles formed by agglomeration of crystals of a nickel hydroxide active material, the surface layer of said particles containing a solid solution nickel hydroxide with manganese incorporated therein and the solid solution containing a higher manganese content than that of the solid solution and the nickel hydroxide active material combined.

9. The positive electrode for an alkaline storage battery in accordance with claim 8, further comprising a compound of at least one element selected from the group consisting of Ca, Sr, Ba, Cu, Ag, Cd, Y and Yb.

10. The positive electrode for an alkaline storage battery in accordance with claim 9, wherein the content of said compound is 0.1 to 5 parts by weight per 100 parts by weight of said active material.

11. A positive electrode active material for an alkaline storage battery produced by a process comprising a step of producing particles of nickel hydroxide active material and a subsequent step in which an aqueous solution containing bivalent nickel ions and manganese ions is reacted with caustic alkali in the presence of said particles of nickel hydroxide active material to form a solid solution nickel hydroxide with manganese incorporated therein on the surface of said nickel hydroxide active material.

12. The positive electrode active material of claim 11, wherein said solid solution is present as crystals growing on the crystal surface of said nickel hydroxide active material and/or crystals independent of the crystals of said nickel hydroxide active material.

13. The positive electrode active material of claim 11, wherein the content of manganese in said solid solution is at least one mole percent of the whole content of metal ions in said solid solution.

14. The positive electrode active material of claim 13, wherein the content of manganese in said solid solution is not lower than three mole percent of the whole content of metal ions in said solid solution.

15. The positive electrode active material of claim 13, wherein the content of manganese in said solid solution is not lower than 10 mole percent of the whole content of metal ions in said solid solution.

16. The positive electrode active material of claim 13, wherein the content of manganese in said solid solution is not higher than 10 mole percent of the combined amount of the metal ions in said nickel hydroxide active material and said solid solution.

* * * * *